United States Patent [19]
Tapper et al.

[11] Patent Number: 5,456,895
[45] Date of Patent: Oct. 10, 1995

[54] PROCESS FOR THE PRODUCTION OF CRYSTALLINE SODIUM SHEET SILICATE WITH KANEMITE STRUCTURE

[75] Inventors: Alexander Tapper, Mönchengladbach; Renate Adrian, Hürth; Günther Schimmel, Erftstadt, all of Germany

[73] Assignee: Hoechst Aktiengesellschaft, Frankfurt am Main, Germany

[21] Appl. No.: 245,371

[22] Filed: May 18, 1994

[30] Foreign Application Priority Data

Jun. 2, 1993 [DE] Germany .................. 43 18 242.9

[51] Int. Cl.⁶ .................................................. C01B 33/32
[52] U.S. Cl. .................................. 423/332; 423/333
[58] Field of Search .................................. 423/332, 333

[56] References Cited

U.S. PATENT DOCUMENTS

| | | | |
|---|---|---|---|
| 4,578,258 | 3/1986 | Rieck | 423/332 |
| 4,581,213 | 4/1986 | Rieck | 423/332 |
| 4,806,327 | 2/1989 | Rieck et al. | 423/332 |
| 4,950,310 | 8/1990 | Rieck et al. | 423/332 |
| 5,211,930 | 5/1993 | Schimmel et al. | 423/332 |

FOREIGN PATENT DOCUMENTS

| | | |
|---|---|---|
| 0164514 | 12/1985 | European Pat. Off. . |
| 0320770 | 6/1989 | European Pat. Off. . |
| 257629 | 6/1988 | Germany ................ 423/333 |

*Primary Examiner*—Wayne Langel
*Attorney, Agent, or Firm*—Connolly & Hutz

[57] ABSTRACT

The present invention relates to a process for the production of crystalline sodium sheet silicate with kanemite structure with the chemical formula $$\text{NaH Si}_2\text{O}_5 \cdot X \text{ H}_2\text{O}$$

in which X represents a value between 1 and 3. Crystalline sodium sheet silicate with kanemite structure is produced by maintaining a mixture of sodium disilicate, silica and water in the molar ratio of 1:2:(6–8) at a temperature of 20° to 100° C. for a period of 0.2 to 10 h.

6 Claims, 2 Drawing Sheets

PROCESS FOR THE PRODUCTION OF CRYSTALLINE SODIUM SHEET SILICATE WITH KANEMITE STRUCTURE

The present invention relates to a process for the production of crystalline sodium sheet silicate with kanemite structure with the chemical formula NaH $Si_2O_5 \cdot X$ $H_2O$ in which X represents a value between 1 and 3.

Modern light-duty detergents and dishwashing agents should have a low pH of 8 to 10 and represent mixtures of many substances containing, inter alia, builders, cobuilders, a bleaching system and a stabilizer. Moreover, sodium tripolyphosphate or zeolite A, for example, are used as builders, polycarboxylates are used as cobuilders, percarbonate or a mixture of perborates and tetraacetylethylenediamine (TAED) is used as bleaching systems, and phosphonates are used as stabilizers.

EP-C 164 514 discloses a detergent and cleaner which, besides surfactants, contains crystalline sodium silicates in sheet form with the composition $NaMSi_xO_{2x+1} \cdot yH_2O$ (with M equal to sodium or hydrogen, x from 1.9 to 4 and y from 0 to 20) as builders. Moreover, crystalline sodium silicates show a higher calcium binding capacity than amorphous types, which is attributable to their structure in sheet form with increased degree of polymerization.

Known crystalline sodium silicates occur in nature, but they are also produced artificially, for example

| Natrosilite | $Na_2Si_2O_5$ |
| Kanemite | $NaHSi_2O_5 \cdot 3H_2O$ |
| Makatite | $Na_2Si_4O_9 \cdot 3H_2O$ |
| Magadiite | $Na_2Si_{14}O_{29} \cdot 11H_2O$ |
| Kenyaite | $Na_2Si_{22}O_{45} \cdot 10H_2O$ |

Of particular interest for use in light-duty detergents and dishwashing agents are the sodium silicates derived from the structure of kanemite, because these display in the wash liquor a lower pH than the sodium silicate which is mentioned in EP-C 164 514 and is essentially composed of $\delta$-$Na_2Si_2O_5$. Kanemite can be produced by treating either $\beta$-$Na_2Si_2O_5$ or $\alpha$-$Na_2Si_2O_5$ with a water/methanol mixture at 100° C. with subsequent heating at 700° C. for 5 to 24 hours and final extraction of the heated material with water.

The disadvantage in this case is that this production is elaborate because of the need for controlled addition of the individual substances and requires considerable safety precautions because of the flammability of methanol.

Kanemite can be obtained by a variant described in EP-C 164 514 when $\delta$-$Na_2Si_2O_5$ is hydrolyzed with water, and the solid is filtered off and dried at 40°–105° C.

The disadvantages of this variant are that the hydrolysis results in a solid which is difficult to filter, and one equivalent of NaOH is removed with the filtrate.

The object of the present invention is to indicate a process for the production of crystalline sodium sheet silicate with kanemite structure of the chemical formula $NaHSi_2O_5 \cdot XH_2O$ in which X represents a value between 1 and 3, with a high Ca binding capacity of 60 to 100 mg Ca/g (based on $NaHSi_2O_5$) and a pH of 10 to 11 for a suspension of 1 g/1000 ml of water, which operates without filtration and where the sodium ions introduced into the process remain in the crystalline sodium sheet silicate with kanemite structure.

The object is surprisingly achieved by sodium disilicate, silica and water being mixed in the molar ratio of 1:2:(6–8) and maintained at a temperature of 20° to 100° C. for a period of 0.2 to 10 h.

Furthermore, optional embodiments of the process according to the invention can entail a) employing as sodium disilicate $\delta$-$Na_2Si_2O_5$ or a mixture of $\delta$-$Na_2Si_2O_5$ and up to 80% by weight of amorphous $Na_2Si_2O_5 \cdot n$ $H_2O$;

b) employing as silica precipitated silica, pyrogenic silica, silica sol or silica gel;

c) employing the sodium disilicate with a particle fineness of less than 1000 µm;

d) employing the silica with a particle fineness of less than 200 µm;

e) maintaining the reaction product where appropriate at 50° to 100° C. for a further 0.5 to 5 h;

f) comminuting the crystalline sodium sheet silicate with kanemite structure by milling to a particle fineness of less than 100 µm.

The crystalline sodium sheet silicate with kanemite structure produced according to the invention can be used as detergent and cleaner builder to eliminate the hardness of water which contains calcium and/or magnesium ions.

The crystalline sodium sheet silicate with kanemite structure produced according to the invention can be composed of

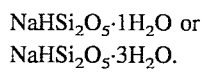

$NaHSi_2O_5 \cdot 1H_2O$ or $NaHSi_2O_5 \cdot 3H_2O$.

Since the partial pressure of water vapor from $NaHSi_2O_5 \cdot 3H_2O$ is high even at temperatures of 40°–70° C., it is possible to convert part of the $NaHSi_2O_5 \cdot 3H_2O$ into $NaHSi_2O_5 \cdot 1H_2O$. The value for X thus represents a value which indicates what proportion of the $NaHSi_2O_5 \cdot 3H_2O$ is already in the form of $NaHSi_2O_5 \cdot 1H_2O$.

If it is particularly important that the crystalline sodium sheet silicate with kanemite structure according to the invention acts to eliminate the hardness of water, a good crystallinity is desirable. The crystallinity of the sodium sheet silicate with kanemite structure can be increased further by a subsequent thermal treatment.

It may be regarded as surprising that, under the production conditions according to the invention, crystalline sodium sheet silicate with kanemite structure is formed even if up to 80% by weight of the crystalline $\delta$-sodium disilicate are replaced by amorphous sodium disilicate in the reaction mixture. Reaction of quartz powder and $\delta$-$Na_2Si_2O_5$ astonishingly does not lead to the formation of crystalline sodium sheet silicate with kanemite structure.

LIST OF STARTING SUBSTANCES

1. $\delta$-$Na_2Si_2O_5$: Was produced by the procedure of DE-A 41 42 711 and can be purchased as SKS-6 from Hoechst AG, Frankfurt.

2. $Na_2Si_2O_5$ (18% $H_2O$): Amorphous sodium disilicate was purchased from Société Française Hoechst, Paris.

3. Precipitated silica: Type FK 320 was purchased from Degussa AG, Hanau.

4. Silica: Type HDKP 170 was purchased from Wacker-Chemie GmbH, Munich.

5. Silica sol: Type Klebosol 1346 was purchased from Société Française Hoechst, Paris.

6. Quartz powder: Type Microsil 20 was purchased from F. Lieben, Maastricht.

EXAMPLE 1

The following were mixed in a Type KM 70 D mixer from Lödige, Paderborn, 3643 g of $\delta$-$Na_2Si_2O_5$ (SKS-6)

2451 g of precipitated silica, loss on drying at 105° C. 6% by weight; loss on ignition at 1000° C. 5% by weight; particle size 0.2% by weight>45 µm; $SiO_2$ content: 98% by weight and 2522 g of water.

The solid mixture was then maintained at a temperature of 60° C. in a closed container for 8 h. After cooling, the product was broken up and milled.

Screen analysis of the final product was as follows:

10%<6.7 µm

50%<28.3 µm

90%<66.5 µm

Figure 1:
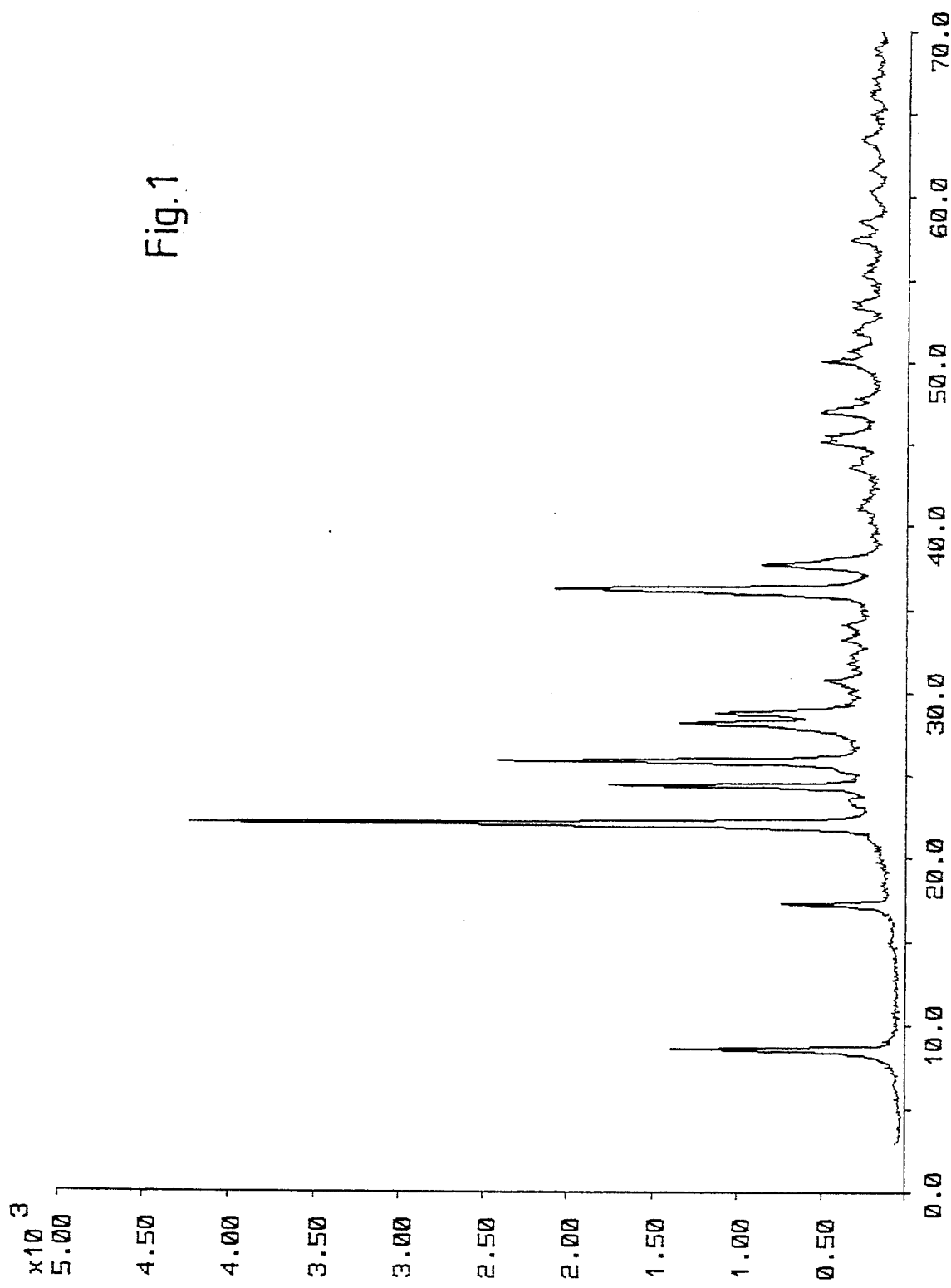
FIG. 1 is an X-ray diffraction diagram of the product of the present invention.

Lines of $\delta$-$Na_2Si_2O_5$ are no longer identifiable in the X-ray diffraction diagram of this product. Only kanemite lines are observed (FIG. 1). The pH of the substance is 10.9 (1 g/l; 7 min), the calcium binding capacity is 75 mg Ca/g (based on $NaHSi_2O_5$).

EXAMPLE 2

The following were vigorously mixed in a laboratory mortar 129 g of silica, $SiO_2$ content: 98% by weight loss on drying: 6% by weight, 182 g of $\delta$-$Na_2Si_2O_5$ with 130 g of water and then maintained at 60° C. in a closed glass bottle for 2 h. After cooling, the product was milled.

The X-ray diffraction diagram showed only kanemite lines.

EXAMPLE 3

The following were mixed together in a laboratory mortar 400 g of silica sol, $SiO_2$ content: 30% by weight, 100 g of $\delta$-$Na_2Si_2O_5$ and 100 g of amorphous sodium disilicate.

172 g of water were evaporated out of this mixture at 60° C. The remaining mixture was maintained at 60° C. in a closed bottle for 2 h and, after cooling, ground in a mortar.

The X-ray diffraction diagram showed only kanemite lines.

COMPARATIVE EXAMPLE

Figure 2:
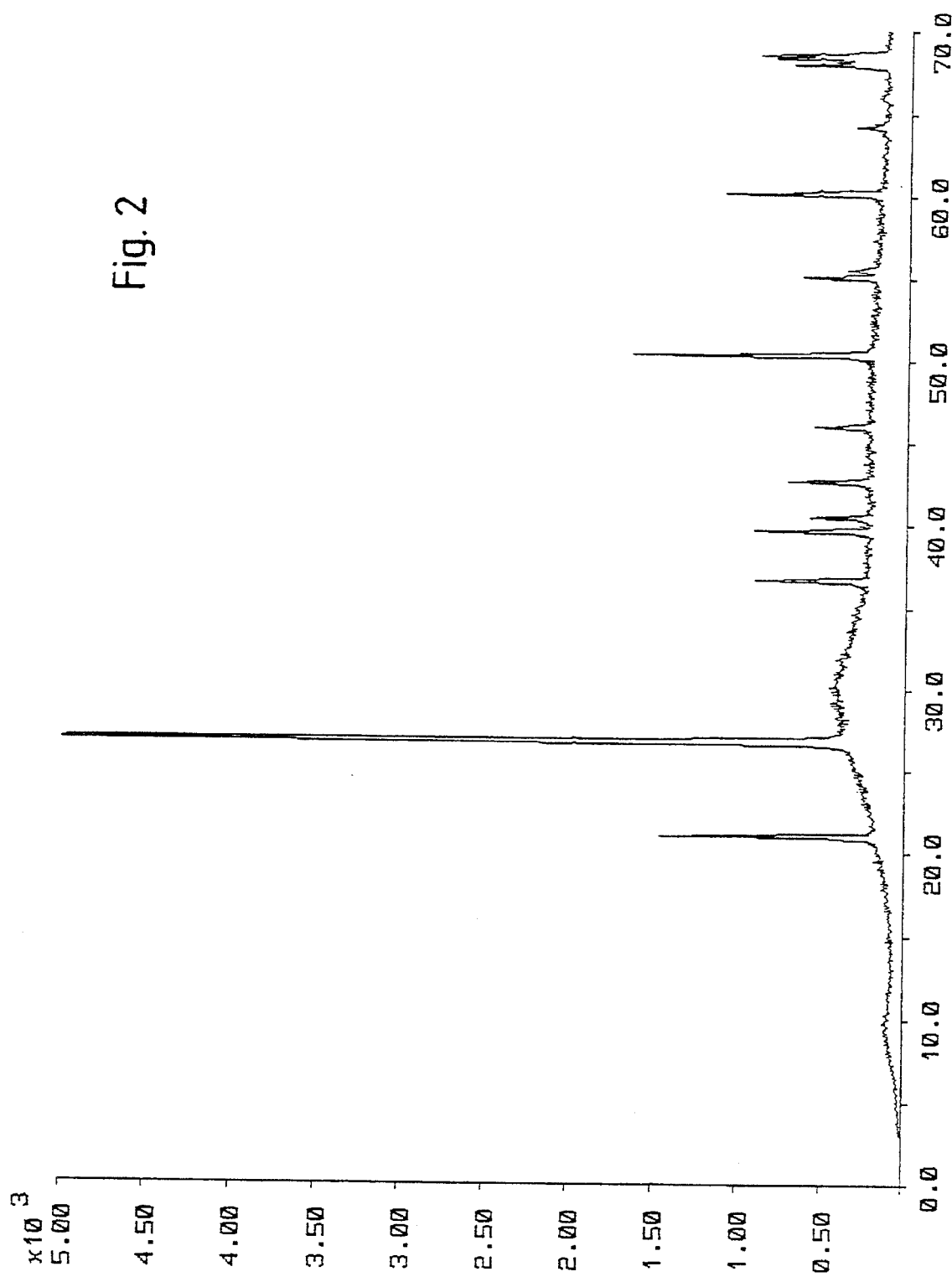
FIG. 2 is an X-ray diffraction diagram of a product made by a comparative example.

The following were vigorously mixed in a laboratory mortar 120 g of quartz powder, $SiO_2$ content: 99.3% by wt. $d_{50}$ 4.4 µm, 180 g of $\delta$-$Na_2Si_2O_5$ and 130 g of water and subsequently maintained at 60° C., in a closed bottle for 8 h. A sticky mass formed, and its X-ray diffraction diagram showed only the diffraction lines of quartz (FIG. 2 ).

We claim:

1. A process for the production of crystalline sodium sheet silicate having kanemite structure and having the chemical formula

$NaH\ Si_2O_5 \cdot XH_2O$ in which X represents a value between 1 and 3, which comprises mixing $\delta$-$Na_2Si_2O_5$, or a mixture of $\delta$-$Na_2Si_2O_5$ and up to 80% by weight of amorphous $Na_2Si_2O_5 \cdot nH_2O$, with silica and water in a molar ratio of 1:2:(6–8) and maintaining the mixture at a temperature of 20° to 100° C. for a period of 0.2 to 10 h to produce said crystalline sodium sheet silicate having kanemite structure.

2. The process as claimed in claim 1, wherein precipitated silica, pyrogenic silica, silica sol or silica gel is employed as silica.

3. The process as claimed in claim 1, wherein the sodium disilicate is employed with a particle fineness of less than 1000 µm.

4. The process as claimed in claim 1, wherein the silica is employed with a particle fineness of less than 200 µm.

5. The process as claimed in claim 1, wherein the reaction product is maintained at 50° to 100° C. for a further 0.5 to 5 h.

6. The process as claimed in claim 1, wherein the crystalline sodium sheet silicate with kanemite structure is comminuted by milling to a particle fineness of less than 100 µm.

* * * * *